Nov. 26, 1963    D. W. JEFFRIES    3,112,014
COMPENSATING BRAKE STRUCTURE
Filed Jan. 30, 1961    4 Sheets-Sheet 1

INVENTOR.
DAN W. JEFFRIES
BY Flam and Flam
ATTORNEYS.

Nov. 26, 1963

D. W. JEFFRIES 3,112,014

COMPENSATING BRAKE STRUCTURE

Filed Jan. 30, 1961

INVENTOR.
DAN W. JEFFRIES
BY Flam and Flam
ATTORNEYS.

Nov. 26, 1963 D. W. JEFFRIES 3,112,014
COMPENSATING BRAKE STRUCTURE
Filed Jan. 30, 1961 4 Sheets-Sheet 4
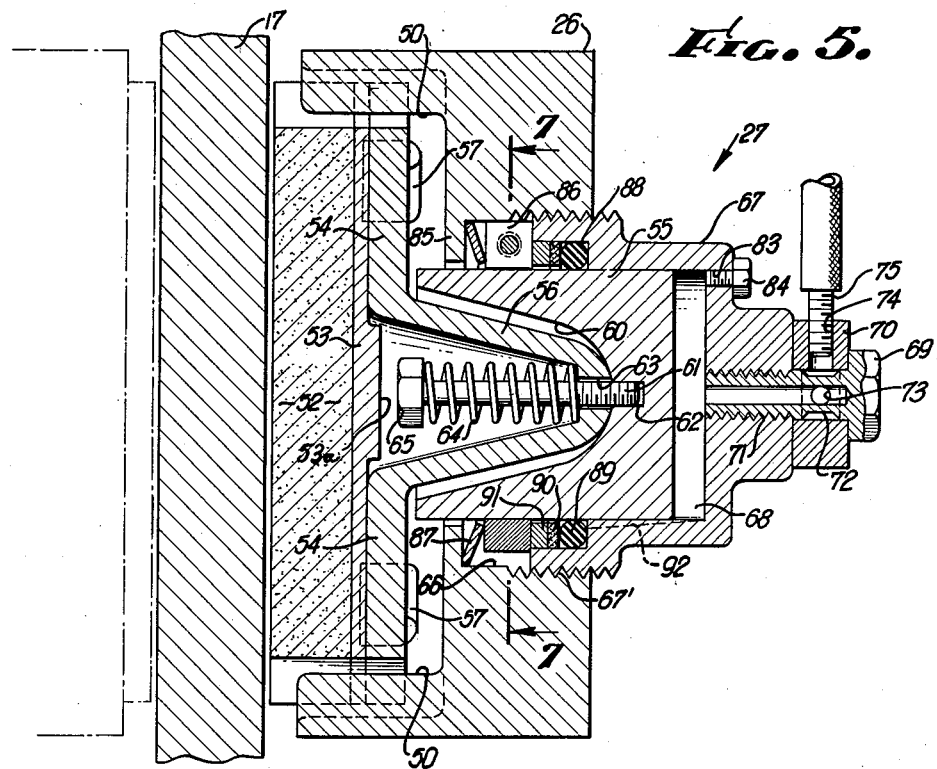
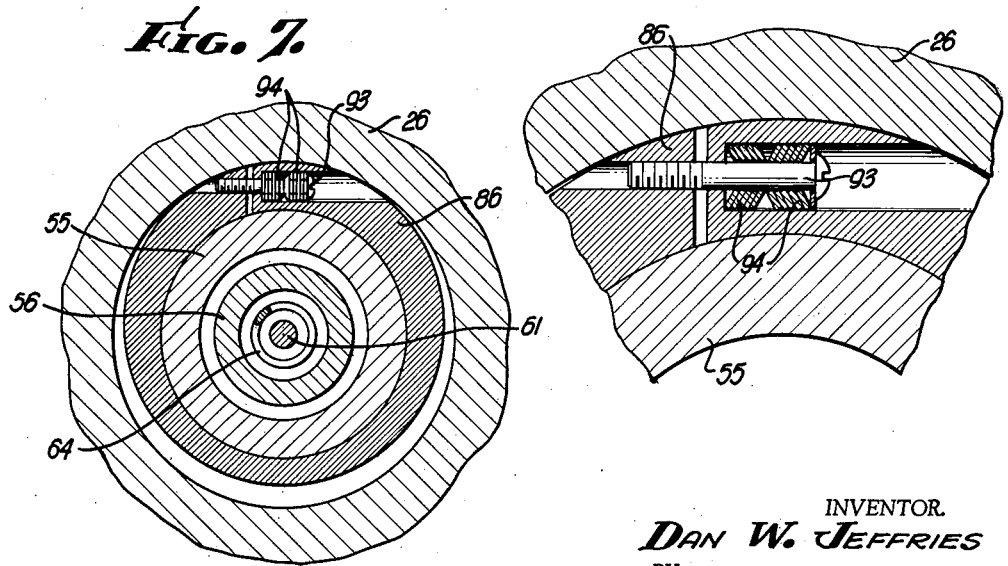
INVENTOR.
DAN W. JEFFRIES
BY
Flam and Flam
ATTORNEYS.

3,112,014
COMPENSATING BRAKE STRUCTURE
Dan W. Jeffries, 2320 Greenfield Ave., Los Angeles 64, Calif., assignor, by mesne assignments, of fifty percent to Harold W. Nash
Filed Jan. 30, 1961, Ser. No. 85,908
10 Claims. (Cl. 188—196)

This invention relates to a brake structure, and particularly a brake structure of the compensating type shown and described in my copending applications, Serial No. 723,495, filed March 24, 1958, for Self-Adjusting Brake or Clutch Mechanism, now Patent No. 2,996,886, issued August 22, 1961, and Serial No. 808,614, filed April 24, 1959, for Self-Adjusting Brake or Clutch Mechanism, now Patent No. 2,995,216, issued August 8, 1961.

In such compensating brake structures, use is made of a supplemental piston for purposes of restoring a preset clearance when the brakes are released. The basic organization consists of a pair of relatively movable members in the form of a piston and a cylinder, friction means yieldingly gripping one of the members, for example, the piston, a limited lost motion connection between the friction means and the other member or cylinder, a spring urging the connection toward one limit corresponding to brake clearance when the friction means is held, and a supplemental piston acted upon by the fluid pressure of the brake system for moving the connection toward the other limit. In this organization, the friction means advances to the limit of its travel, and while system pressure is adequate to overcome friction and spring compression load, the piston moves forward or rearward whether affected by flexure, heat, wear or other causes, and the retraction occurs to the preset clearance just as soon as the system pressure reduces to a certain minimum value necessary to permit the retracting spring to return the main piston.

In my application, Serial No. 808,614, there is shown a sealed bellows that operates as the supplemental piston in order to eliminate all seals except the main piston ring. A much simplified and more reliable device accordingly resulted.

An object of the present invention is further to simplify the structure of a compensating brake actuator of this character by utilizing the piston ring itself as the supplemental piston.

Another object of this invention is to provide an improved brake piston that incorporates means whereby the brake lining material carried thereby automatically accommodates itself to the brake disk.

Another object of this invention is to provide a simple brake structure that can readily be attached to the relatively rotary parts.

Still another object of this invention is to provide a disk brake that can readily be used as a replacement for other brake systems.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 4:
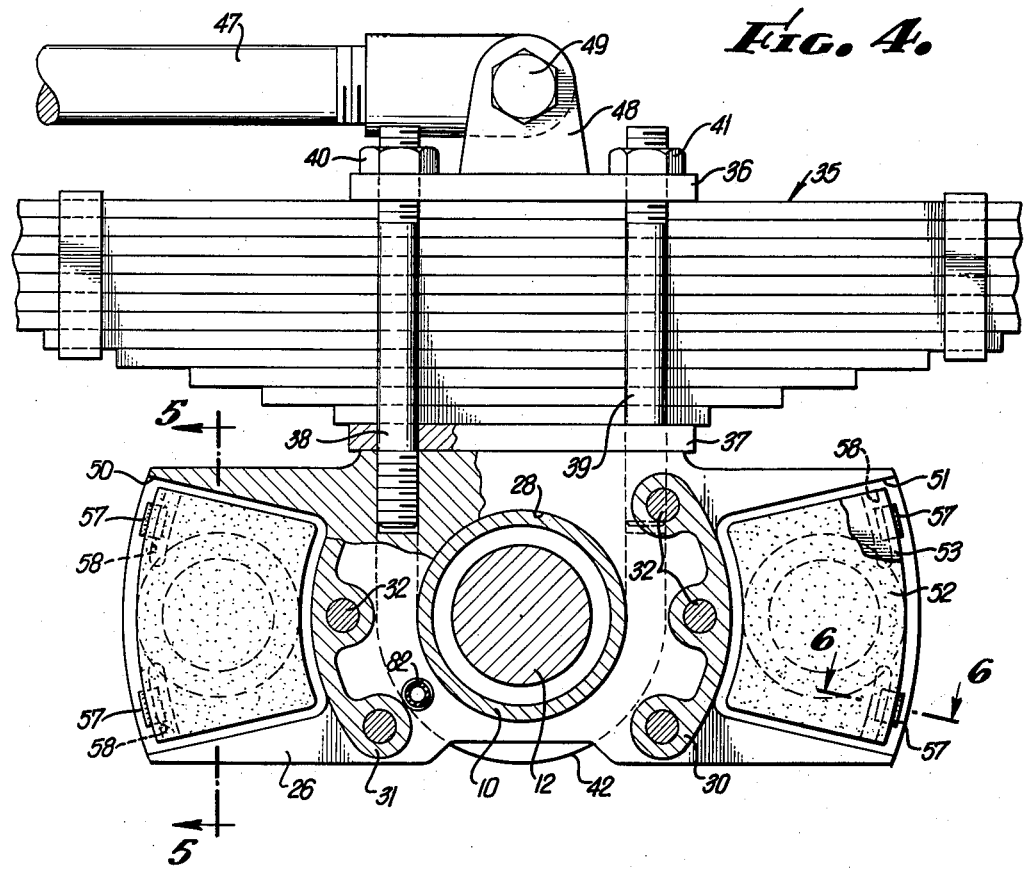
FIG. 4 is an enlarged sectional view taken along a plane corresponding to line 4—4 of FIG. 2.
Figure 6:
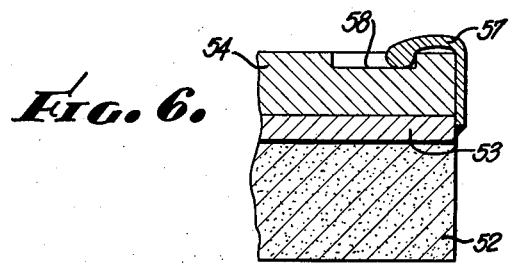

FIGS. 5 and 6 are enlarged detailed sectional views taken along planes corresponding to lines 5—5 and 6—6 of FIG. 4;

FIG. 7 is a sectional view taken along a plane corresponding to line 7—7 of FIG. 5; and FIG. 8 is an enlarged fragmentary sectional view of a portion of the apparatus of FIG. 7.

By way of example, the brake structure incorporating the present invention is illustrated installed at the rear axle 10 of the truck. A hub 11 (FIGS. 2 and 3) is supported for rotation relative to the axle 10 by suitable bearing means not shown, whereby it may be driven by a power shaft 12. A double wheel disk 13 attached to the outer side of a radial flange of the hub 11 mounts inner and outer wheels 14 and 15.

In place of the usual brake drum normally accommodated at the inner side of the wheel disk is a mounting 16 for a brake disk 17. The mounting 16 is generally cylindrical, with a wall 18 at one end placed against the inner side of the hub flange. Common fastening means 19 secure both the wheel disk 13 and the mounting 16 to the hub 11.

The periphery of the brake disk 17 abuts a series of interiorly threaded embossments 20 located equiangularly about the peripheral portion of the inner end of the mounting 16. Screws 21 pass through apertures 22 in the disk and engage the threaded embossments 20 firmly to clamp the disk 19. The disk 17 projects inwardly from the mounting 16 for cooperation with the brake structure presently to be described. Its central aperture 23 is spaced substantially from the axle 10.

A brake caliper 24 has parts 25 and 26 extending opposite sides of the brake disk 17 for mounting four brake actuators 27, two on each side of the disk 17. The brake actuators 27, diametrically disposed relative to the axle 10, and actuators on opposite sides of the disk 17 are aligned to react against each other.

Figure 1:
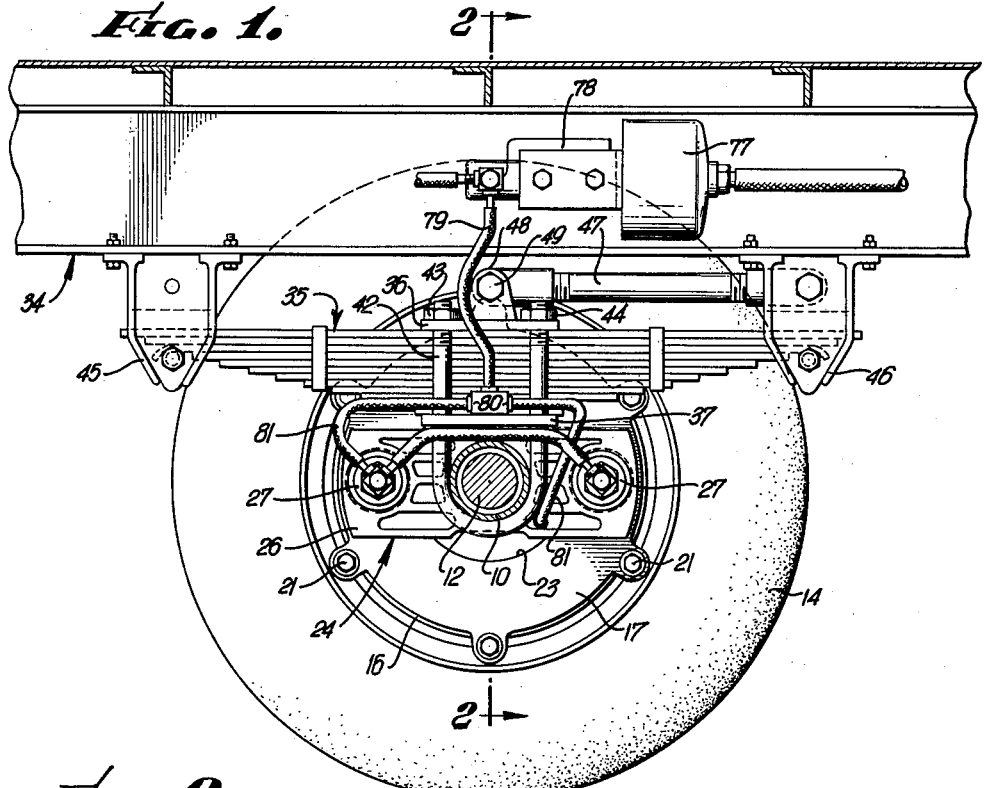
FIGURE 1 is a vertical sectional view of a vehicle incorporating the present invention and taken transverse to the axle upon which a wheel is mounted.

The caliper parts 25 and 26 in this instance are both rectangular in configuration, as shown in FIG. 1. Both of the parts 25 and 26 have apertures 28 and 29 fitting the axle 10. The caliper part 26 has two arcuate flanges 30 and 31 (see FIG. 4) that project through the clearance space between the aperture 23 of the brake disk 17 and the axle 10. A series of screws 32 pass through apertures in the caliper part 25 and engage threaded recesses 33 in the flanges 30 and 31 in order to secure the caliper parts together.

Figure 2:
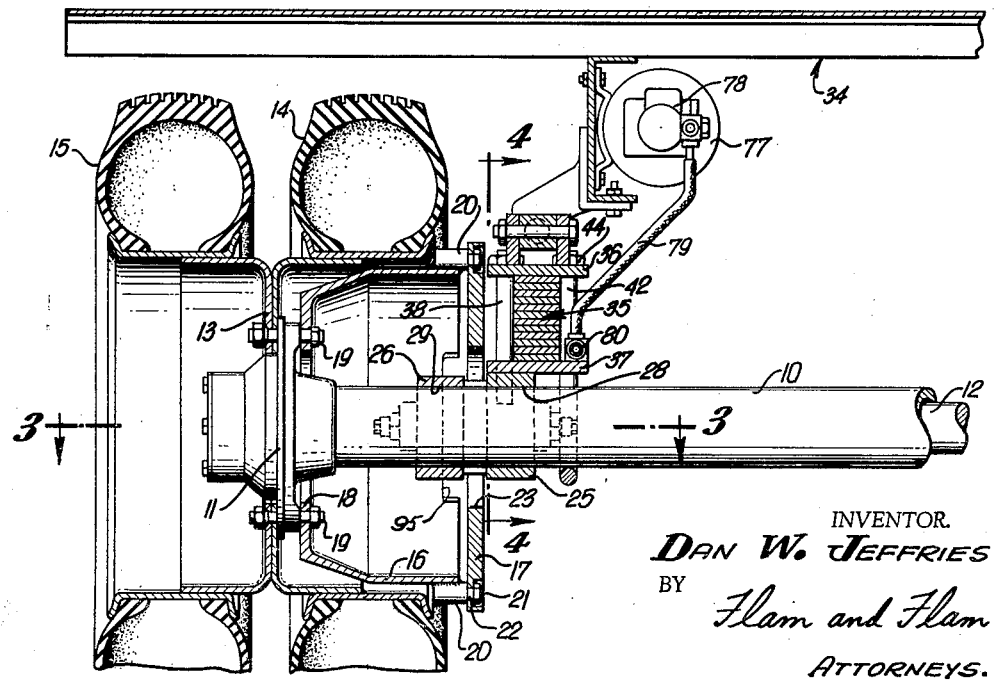
FIG. 2 is a sectional view taken along a plane indicated by line 2—2 of FIG. 1.
Figure 3:
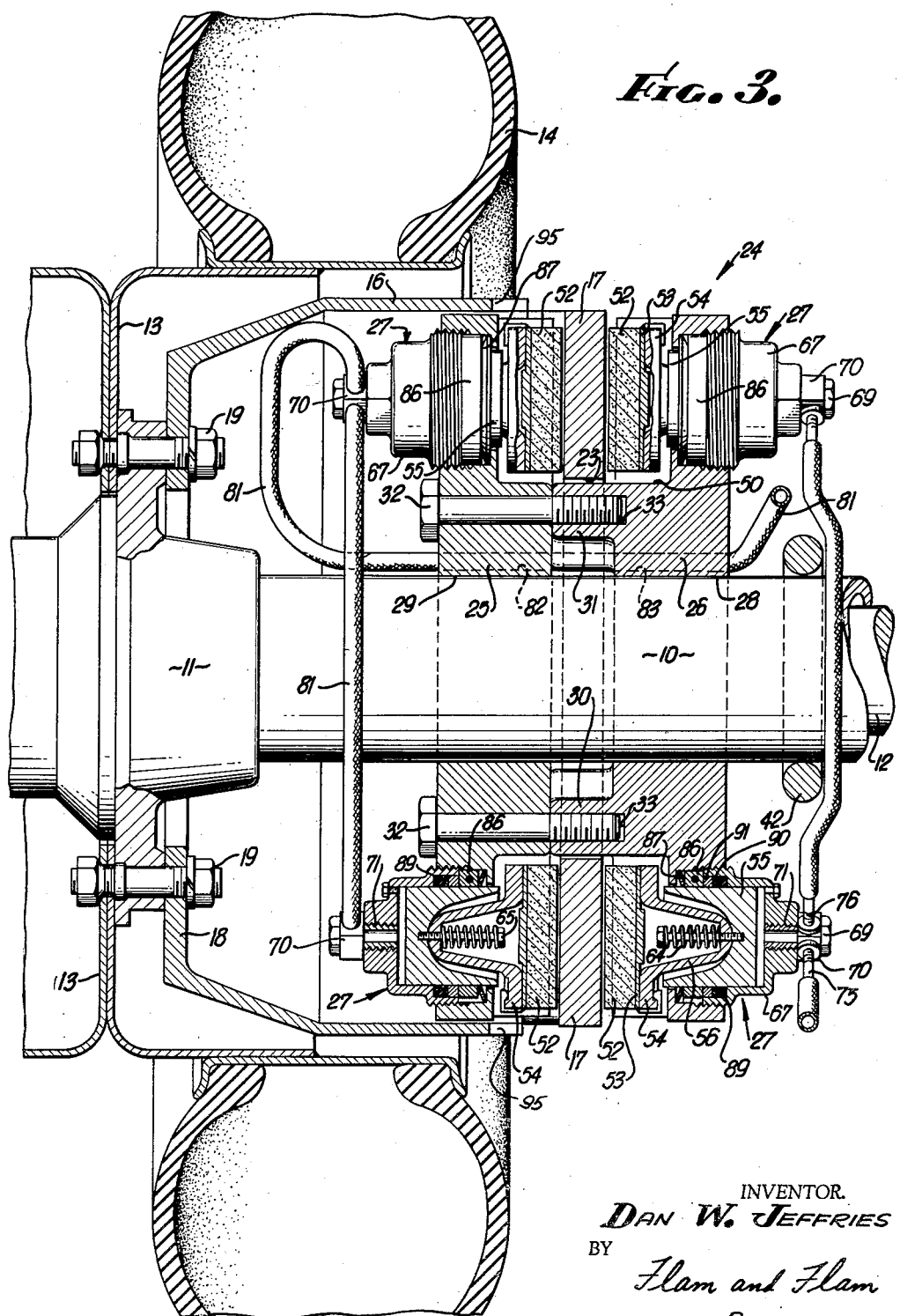
FIG. 3 is an enlarged sectional view taken along a plane corresponding to line 3—3 of FIG. 2.

Calipers 24, together with the axle 10, are connected to the frame 34 of the vehicle through a composite leaf spring structure 35, as shown in FIGS. 1, 2 and 4. The elements of the leaf spring structure 35 are confined between the plates 36 and 37 that overhang the springs on opposite sides as shown in FIG. 2. Studs 38 and 39 extend upwardly from the caliper part 25 and through apertures of the plates 36 and 37 of the one side of the leaf spring structure 35. Nuts 40 and 41 engage the top plate 36 and confine the leaf spring structure 35 against the caliper part 25.

On the other side of the leaf spring structure 35 is a U-bolt 42 that encompasses the axle 10 and extends upwardly through aligned apertures in the plates 36 and 37. Nuts 43 and 44 (FIG. 1), accommodated on the ends of the U-bolts, engage the top plate 36.

The ends of the leaf spring structure engage conventional brackets 45 and 46 suspended from the frame 34. A bar 47 attached to one of the brackets 46 and to the top plate 36 transfers to the frame the reaction torque on the caliper structure independently of the axle 10. A clevis 48 formed on the upper plate 36 mounts a bolt 49 and passes through an aperture in the bar 47. The other end of the bar 47 is correspondingly mounted on the frame bracket 46. To facilitate installation of the bar 47, it comprises two or more parts threadedly engaging each other whereby the length of the bar 47 can be adjusted to fit the installation.

The caliper part 26, as shown in FIGS. 4 and 5, has diametrically disposed recesses 50 and 51 facing the disk 17, and in each of which friction material 52 for engaging the disk 17 is accommodated. The recesses are generally of segmental shape extending inwardly from the outer edge of the caliper part 26 to the area generally adjacent the connecting flange 31. The caliper part 25 has similar recesses. A description of one actuator 27 and its friction material suffices as a description of all of them since they are identical.

The friction material 52 is initially of uniform thickness and has a peripheral contour slightly smaller than, but generally corresponding to, its recess 50. The material 52 is bonded to a backing plate that has a contour corresponding thereto. The backing plate 53 in turn clasps a pressure pad 54, which is connected to the brake operating piston 55 of the actuator 27 in a manner presently to be described.

The pressure pad 54 has a contour corresponding to that of the friction material 52 and the backing plate 53. It is flat except for central rearwardly extending hollow crown 56.

The backing plate 53 is held against the pressure pad 54 by two angled clips 57. The clips 57 project rearwardly from the outer edge of the backing plate 53, and, as shown in FIG. 6, are welded thereto. The angle clips 57 extend over the corresponding edge of the pressure pad 54 and return inwardly behind the rear surface of the pressure pad 54. The ends of the angle bracket 57 have projections 58 received within arcuate grooves 59 on the rear surface of the pressure pad 54. The backing plate 53, together with the friction material 52, by virtue of the arcuate grooves 59, can move angularly about the axis of the grooves 59. This axis by virtue of the location of the piston 55 is centered at the axle 10.

The pressure pad 54 is attached to the operating piston 55 by having its crown 56 confined against the bottom of a cup-like recess 60 in one end of the piston 55. The bottom of the cup recess 60 is formed as a section of a spherical surface to provide a seat for the crown 56, which may also be formed as a segment of a spherical surface. The height of the crown 56 exceeds that of the recess 60 and the walls of the recess 60 diverge from the crown 56. Accordingly, the pressure pad 54, when confined against the bottom of the recess 60, is nevertheless capable of limited tilting movement about any axis lying in the tangent plane between the contacting surfaces.

In order to maintain the pressure pad in engagement with the piston 55, a screw 61 is provided that is mounted at a small recess 62 in the bottom of the main piston recess 60. The screw projects with clearance through an aperture 63 in the center of the crown 56. A compression spring 64 surrounds the screw 61 within the hollow crown 56 and bears at opposite ends against the head 65 of the screw and the edges about the inner side of the crown aperture 63.

A circular aperture 66 in the caliper part 26 opens at one end at the segmental recess 50 and at the other, in the rear or outer surface of the caliper part 26. The piston 55 projects through the aperture 66. A cup 67 accommodated in the outer end of the aperture 66 by a threaded engagement therewith, as at 67', defines a cylinder space 68 in which the piston 55 is received.

The base of the cup 67 mounts a fitting 69 that cooperates with a manifold ring 70 for the purpose of admission of fluid under pressure to the cylinder space 68. The fitting 69 is in the form of a hollow screw that is threadedly received within a through aperture 71 in the base of the cup 67. At the base of the shank of the screw 69 is an annular groove 72 that registers with the hollow screw interior via a transverse port 73. The manifold ring 70 is clamped between the head of the fitting 69 and the edges of the cup around the outer end of the aperture 71. A transverse bore 74 in the ring 70 cooperates with the threaded end of a conduit fitting 75.

Secondary apertures may be provided in the manifold ring as at 76 (FIG. 3), for the purpose of establishing connections to the manifold rings of the other actuator structures. In FIG. 1 is shown an air powered device 77 for operating a master cylinder 78 that by conduit means 79, a distributor body 80 and conduits 81, etc., leads to the manifold rings of the several actuators. Aligned apertures 82 and 83 in the anvil parts provide access on opposite sides for the conduit means.

In FIG. 5 appears a bleed hole 83 closed by a set screw 84.

The inner end of the cup 67 is spaced from an inwardly directed flange 85 at the inner end of the anvil aperture 54. In the space thereby defined is a friction ring 86 which encompasses that portion of the piston 55 that projects beyond the cup 67. The ring 86 frictionally but yieldingly grips the piston, slippage occurring only upon the existence of a predetermined force therebetween. A spring washer 87 is interposed between the flange 85 and the friction ring 86 and urges the friction ring 86, and thus the piston 55, in a direction corresponding to retraction of the brake friction material 52. The normal limit of movement of the piston 55 is determined by the spacing of the bottom of the inner end of the cup 67 from the flange 85, the width of the friction ring 86 and the effective thickness of the spring washer 87.

A groove 88 at the outer end of the cup 67 mounts a piston ring in the form of a rubber O-ring 89, a leather washer 90 and a metal transfer ring 91 that engages the friction ring 86.

The fluid of the cylinder space 68 communicates with one side of the O-ring 89 which is at the bottom of the groove 88, the actual seal of the cylinder space being accomplished by engagement of the ring 89 respectively with the groove 88 and the piston 55.

Access of fluid may normally be achieved by virtue of slight clearance between the piston 55 and the cup 67. However, a groove 92 may also be provided.

The O-ring 89 is capable of movement in the groove 88, and in fact operates as a supplemental piston, insuring at all times that a preset clearance will be restored between the friction material 52 and the brake disk 17.

In the retracted position illustrated in FIG. 5, the friction ring 86 is caused to engage the end of the cup 67 by the spring washer 87, and the distance between the friction material 52 and the brake disk 17 corresponds precisely to the permitted movement of the friction ring 86 in the caliper aperture 66. The desired clearance is easily modified by moving the cup inwardly or outwardly. Upon application of fluid pressure to the cylinder space 68, the piston 55 advances with the O-ring 89, the leather washer 90, the transfer ring 91 and the friction ring 86. The small force of the spring ring 87 is overcome at a certain system pressure, and the friction ring 86 is bottomed. The friction material 52 lightly engages the brake disk 17.

As system pressure is increased above spring pressure, the friction ring 86, not the brake disk 17, opposes movement of the piston 55 until the system pressure reaches a value corresponding to reset pressure. The reset pressure is the system pressure which produces a force adequate to cause yielding between the piston 55 and the friction ring 86, and is of a value slightly higher than the spring pressure.

Accordingly, as the pressure builds up, the piston 55 exerts more and more force upon the brake disk 17 through the brake lining friction material 52. Due to this force, the caliper 26 flexes rearwardly, and the piston 55 advances relative to the bottomed friction ring 86. Furthermore, the material 52 may wear away, also causing relative advancement of the piston 55. Also, the friction material 52 may heat and expand, causing the piston 55 to retract relative to the bottomed friction ring 86. During such advancements or retractions of the piston 55, the friction ring 86 is held against the flange 85 by the action of the supplemental piston or sealing ring 86. In any case, just as soon as the pressure is reduced to the small value corresponding to the reset pressure, virtually all of the flexure in the caliper 26 is eliminated, and a slight force exists between the material 52 and the disk 17. Now, upon further reduction in pressure, the piston 55, friction ring 86, transfer ring 91, washer 90 and seal ring 89 retract in unison and the clearance corresponding to the limited movement of the friction ring 86 is restored to whatever may be the effective dimension of the material 52 due to heating or wear. The brake is ready for immediate reapplication.

If the material 52 cools, the clearance increases. The desired clearance will be restored on the reapplication of the brakes as long as system pressure exceeds reset pressure. Thus, the piston 55 will advance relative to the gripper ring 86 and the clearance will be reduced.

If the clearance between the friction material 52 and the disk 17 is initially too small, which occurs, as a rule, only when new friction material is installed, the clearance will be restored due to the action of the supplemental piston 89 in a like manner. In this instance, the piston 55 will reach its limit of movement before the friction ring 86 is bottomed against the flange 85. Upon further application of pressure to the reset value, the supplemental piston causes the friction ring 86 to advance. The desired clearance is again restored.

It is, of course, desirable to ensure resetting at a low pressure. Yet the reset pressure must positively be greater than the spring pressure, for otherwise clearance will be lost. Reliable means must be provided to impose a definite friction force between the parts. For this purpose, the ring 86 is split, as shown in FIG. 7. A screw 93 draws the ends together. To ensure that the force exerted by the screw 93 is constant, spring washers 94 are interposed beneath the head of the screw. The spring washers 94 have an approximately constant spring rate for a considerable spring deflection above and below their normally installed position. As long as the washers 94 are tensioned, but not bottomed, the force acting on the head, and hence the force urging the ends of the ring together, is constant.

The relative tilting movement permitted between the pressure pad 54 and the piston 55 allows the surface of the friction material 52 to conform to the brake disk 17, despite lack of uniform thickness of the material 52. The thickness of the lining 52 as a result of wear is ordinarily reduced at one edge, but this does not detract from the proper operation of the brake due to the connection at the spherical surfaces of the crown 56 and the cup recess 60. The friction material 52 conforms at each application of the brakes.

The disk 17, of course, tends to rotate the friction material 52 and the backing plate 53 about the axis of rotation of the disk 17. The friction material 52 and the backing plate 53 move relative to the pressure pad 54 to a limit determined by the side edges of the caliper recess 50. The arcuate groove 59 in which the clips 57 operate, has a center corresponding to the axis of the brake disk 17. Preferably, the friction material 52 overhangs the backing plate 53 in order to ensure that the engagement is between the friction material and the recess, rather than between the edge of the backing plate and the recess. Depending upon the direction of rotation of the friction disk 17, that is, whether or not the vehicle is going forward or rearward, one edge or the other of the friction material will contact the corresponding side of the recess 50. The bar 47 transfers the torque to the frame.

The force urging the material 52 against the sides of the recess 50 acts perpendicular to lines radial of the axle 10. But the sides of the recess 50 are not radial to the axle 10. Due to the angularity, the force urging the material 52 against the side of the recess has an inward component, which urges the clips 57 into engagement with the outer edge of the pressure pad 54. Despite the simplicity of the attachment of the backing plate 53 to the pressure pad 54, the desired connection is accordingly maintained.

In order to remove the brake for servicing, the fasteners 19 (FIG. 3) can be removed and the disk 13 and the hub 11 pulled. The bolts 32 can then be manipulated so that the mounting 16, brake disk 17 and anvil or caliper part 25 can be removed from the axle 10, the fluid lines being slackened or broken.

The friction material for the actuators on the caliper parts 25 and 26 can, however, be removed and replaced without removal of any parts of the brake assembly. To replace the material 52, it is only necessary to flex the clips 57 out of and into grooves 59. To provide access to the friction material on caliper half 26, two diametrically disposed slots 95 (FIGS. 2 and 3) are provided in the mounting 16.

A central boss 53a (FIG. 5) is provided in the backing plate 53 that interfits the hollow crown 56. This ensures that the backing plate will not drop out even if both clips 57 are for some reason broken. The height of the boss 53a need only slightly exceed the preset clearance.

The inventor claims:

1. In a brake structure: a support having means forming a cylinder; a brake operating piston movable in the cylinder; a sealing ring between the brake operating piston and the cylinder and capable of movement along the cylinder and along the piston; a friction ring secured to the piston for movement therewith and capable of movement along the brake operating piston only upon application of adequate force therebetween; said sealing ring, upon application of pressure in said cylinder, acting upon said friction ring and moving therewith; means carried by the support for limiting movement of the friction ring as the sealing ring advances; and spring means for retracting the friction ring upon release of fluid pressure.

2. The combination as set forth in claim 1 in which the friction force between the brake operating piston and the friction ring is predetermined and overcome at a cylinder pressure slightly greater than the cylinder pressure necessary to overcome said spring means.

3. The combination as set forth in claim 1 in which said friction ring is split, there being a screw for drawing the ends towards each other, and there being spring washers interposed between the screw and one ring end to maintain substantially constant, the frictional force between the piston and the friction ring, and substantially independently of the degree of compression of said washers.

4. In a brake structure: a support having a through bore and abutment means at one end of the bore; a cup threadedly engaging the other end of the bore, and forming a cylinder; a brake operating piston having one end working in the cylinder and its other end accessible at the said one end of the bore; a sealing ring between the brake operating piston and the cylinder and capable of movement along the cylinder and along the brake operating piston; a friction ring secured to the other end of the brake operating piston and capable of movement between the inner end of the cup and the said abutment means; the sealing ring reacting against and movable with the friction ring to urge it toward the abutment; the friction ring being capable of movement along the brake operating piston only upon the existence of adequate force therebetween; and spring means urging the friction ring toward the inner end of said cup; the position of the cup inwardly of the support bore determining the movement of the friction ring between the said abutment means and the end of said cup.

5. In a brake structure: a support member and an actuating member relatively movable in opposite directions respectively for engaging and releasing functions; means forming a space for admission of pressurized fluid between the members for urging the members toward engaged position; friction means engaging one of the members and capable of yielding upon the existence of adequate force to move in said directions; abutment means on the other of the members for determining limited movement of the friction means in said directions; yielding means capable of storing energy and urging said friction means toward one limit corresponding to releasing position; a piston for moving said friction means to the opposite limit, comprising a pliant comformable sealing ring between the members and sealing said space; said sealing ring being movable in said directions relative to both of said members.

6. In a brake structure: a support having means forming a cylinder; a brake operating piston; a supplemental piston fitting between the brake operating piston and the cylinder and capable of movement along the cylinder and along the brake operating piston; a friction ring secured to the brake operating piston for movement therewith and capable of movement along the brake operating piston only upon application of adequate force therebetween; said supplemental piston, upon application of pressure in said cylinder, acting upon said friction ring and movable therewith; means carried by the support for limiting movement of the friction ring as the supplemental piston advances; and spring means for retracting the friction ring upon release of fluid pressure.

7. In a brake structure: a brake cylinder having an inner cylinder part and an outer cylinder part separated by an outwardly facing annular shoulder; a brake operating piston having a cylindrical outer surface slidably guided by the inner cylinder part; a friction ring mounted on and yieldingly gripping the surface of the brake operating piston and located in the outer cylinder part; means determining an outward limit to the movement of the friction ring while permitting advancement of the brake operating piston; return spring means for retracting the friction ring a preset distance from its outward limit; a supplemental annular piston surrounding the brake operating piston and located between the shoulder and the friction ring; and means for simultaneously conducting brake fluid under pressure to the inner cylinder part behind the brake operating piston and to the space between the shoulder and said supplemental piston.

8. The combination as set forth in claim 7 in which said supplemental piston comprises a pliant conformable sealing ring between the brake operating piston and the outer cylinder part and movable both with respect to the said outer cylinder part and said brake operating piston.

9. In a brake structure: a brake cylinder having an outer opening and an inner end; a brake operating piston movable in the cylinder; means guiding the brake operating piston for movement in a path outwardly and inwardly of the cylinder while exposing the entire area of the brake operating piston for application of the pressure of brake fluid conducted to the inner end of said cylinder; a friction ring surrounding the brake operating piston and yieldingly gripping the brake operating piston; means determining an outward limit to the movement of the friction ring while permitting advancement of the brake operating piston; return spring means for retracting the friction ring a preset distance from its outward limit; a supplemental piston between the friction ring and the inner end of the cylinder and having an operative area located entirely in peripheral relationship to the brake operating piston; and means for simultaneously conducting brake fluid under pressure to the inner end of said cylinder and to the operative area of said supplemental piston.

10. The combination as set forth in claim 9 in which said supplemental piston comprises a pliant conformable sealing ring between the brake operating piston and the cylinder, said ring being supported for movement both with respect to the cylinder and with respect to the piston.

References Cited in the file of this patent

UNITED STATES PATENTS

| | | |
|---|---|---|
| 1,210,291 | Fend | Dec. 26, 1916 |
| 2,568,858 | Kovac | Sept. 25, 1951 |
| 2,746,254 | Lucien | May 22, 1956 |
| 2,915,147 | Davis | Dec. 1, 1959 |
| 2,957,706 | Hanley | Oct. 25, 1960 |
| 2,968,370 | Ruet | Jan. 17, 1961 |
| 2,997,138 | Cagle | Aug. 22, 1961 |
| 3,032,144 | Stanton | May 1, 1962 |

FOREIGN PATENTS

| | | |
|---|---|---|
| 461,409 | Italy | Jan. 26, 1951 |
| 461,453 | Italy | Jan. 29, 1951 |
| 1,047,544 | Germany | Dec. 24, 1958 |